(12) United States Patent
Endo et al.

(10) Patent No.: US 9,377,889 B2
(45) Date of Patent: Jun. 28, 2016

(54) RESISTANCE FILM TYPE TOUCH PANEL AND TOUCH PANEL APPARATUS

(71) Applicant: NISSHA PRINTING CO., LTD., Kyoto-shi, Kyoto (JP)

(72) Inventors: Yuko Endo, Kyoto (JP); Yoshihiro Kai, Kyoto (JP); Daisuke Imura, Kyoto (JP); Yutaka Sakai, Kyoto (JP); Jumpei Morita, Kyoto (JP)

(73) Assignee: NISSHA PRINTING CO., LTD., Kyoto (JP)

( * ) Notice: Subject to any disclaimer, the term of this patent is extended or adjusted under 35 U.S.C. 154(b) by 0 days.

(21) Appl. No.: 14/412,304

(22) PCT Filed: Jun. 5, 2013

(86) PCT No.: PCT/JP2013/065531
§ 371 (c)(1),
(2) Date: Dec. 31, 2014

(87) PCT Pub. No.: WO2014/013807
PCT Pub. Date: Jan. 23, 2014

(65) Prior Publication Data
US 2015/0153885 A1    Jun. 4, 2015

(30) Foreign Application Priority Data
Jul. 19, 2012    (JP) .................. 2012-160289

(51) Int. Cl.
| G06F 3/041 | (2006.01) |
| G06F 3/045 | (2006.01) |
| G01L 1/20  | (2006.01) |
| G06F 3/047 | (2006.01) |

(52) U.S. Cl.
CPC .............. *G06F 3/0414* (2013.01); *G01L 1/205* (2013.01); *G06F 3/045* (2013.01); *G06F 3/047* (2013.01); *G06F 2203/04105* (2013.01); *G06F 2203/04107* (2013.01)

(58) Field of Classification Search
CPC ....... G06F 3/0414; G06F 3/045; G06F 3/047; G06F 2203/04105; G06F 2203/04103; H05K 1/097; G02F 1/13458; G02F 2001/136236
USPC ............................................ 178/18.01, 18.05
See application file for complete search history.

(56) References Cited

U.S. PATENT DOCUMENTS

| 5,543,589 A * | 8/1996 | Buchana | ............ H03K 17/9618 178/18.03 |
| 2011/0115738 A1 * | 5/2011 | Suzuki | .................... G01L 1/205 345/173 |

(Continued)

FOREIGN PATENT DOCUMENTS

| JP | 2006-85687 A | 3/2006 |
| JP | 2006-250705 A | 9/2006 |
| JP | 2009-282825 A | 12/2009 |

OTHER PUBLICATIONS

International Search Report in PCT/JP2013/065531 dated Aug. 13, 2013.

*Primary Examiner* — Sanjiv D Patel
(74) *Attorney, Agent, or Firm* — Global IP Counselors, LLP (57) ABSTRACT

A resistive film type touch panel is configured to reduce damage that is caused by contact between electrodes in a resistive film type touch panel that includes a plurality of first electrodes and a plurality of second electrodes that extend in direction that intersect one another. The resistive film type touch panel includes a plurality of lower side electrodes and a plurality of upper side electrodes. The lower side electrode extends in the Y direction. The upper side electrode X1 extends in the X direction, which intersects the Y direction, and opposes the plurality of lower side electrodes. Each lower side electrode includes an electrically conductive layer and protective layers, and a silver layer and a carbon layer extend in the Y direction. The protective layers are formed on edge parts on both sides in the width direction of the electrically conductive layer such that they extend in the direction.

14 Claims, 10 Drawing Sheets

(56) References Cited

U.S. PATENT DOCUMENTS

2011/0198712 A1* 8/2011 Okumura ............... G01L 1/205 257/415

2012/0105359 A1* 5/2012 Kim ....................... G06F 3/045 345/174

* cited by examiner

RESISTANCE FILM TYPE TOUCH PANEL AND TOUCH PANEL APPARATUS

CROSS-REFERENCE TO RELATED APPLICATIONS

This U.S. National stage application claims priority under 35 U.S.C. §119(a) to Japanese Patent Application No. 2012-160289, filed in Japan on Jul. 19, 2012, the entire contents of Japanese Patent Application No. 2012-160289 are hereby incorporated herein by reference.

BACKGROUND

1. Field of the Invention

The present invention relates to a resistive film type touch panel and to a touch panel apparatus including the same.

2. Background Information

Among conventional resistive film type touch panel apparatuses, there are analog types and digital types. A digital type (matrix type) resistive film type touch panel apparatus includes upper and lower line shaped electrodes that extend in an intersecting direction, wherein, when opposing electrodes contact one another owing to a finger or a pen pressing down, the position of that contact is detected as the intersection point of the lines (e.g., refer to Japanese Unexamined Patent Application Publication No. 2009-282825).

SUMMARY

In a resistive film type touch panel apparatus, the electrodes are made, for example, of an electrically conductive material, such as silver or carbon, which is formed on a film. In addition, in recent years, electrodes have also been developed wherein, to detect the pressing force, the electrodes are coated with a pressure sensitive ink.

In a resistive film type touch panel apparatus, edge parts on both sides in the width direction of one electrode contact a principal surface of another electrode during the touch panel push down operation, and therefore the electrodes tend to get damaged. As a result, at the edge parts on both sides in the width direction of the electrodes, problems occur wherein, for example, an external layer peels and an internal layer is thereby exposed.

An object of the present invention is to reduce damage caused by contact between electrodes in a resistive film type touch panel that includes a plurality of first electrodes and a plurality of second electrodes that extend in a direction that intersects one another.

The aspects of the invention are explained below as the technical solution. These aspects can be arbitrarily combined as needed.

A resistive film type touch panel according to one aspect of the present invention includes a plurality of first electrodes and a plurality of second electrodes. The first electrodes extend in a first direction. The second electrodes extend in a second direction, which intersect the first direction, and oppose the plurality of first electrodes. Each first electrode includes an electrically conductive layer and protective layers, and the electrically conductive layer extends in the first direction. The protective layers are formed on edge parts on both sides in a width direction of the electrically conductive layer such that they extend in the first direction.

In this touch panel, when a user presses an intersection point of one of the first electrodes and one of the second electrodes, the coordinates of that intersection point are detected. In this case, the edge parts on both sides in the width direction of the electrically conductive layer of the first electrode are protected by the protective layers and therefore tend not to get damaged.

The protective layers may be formed, in the first direction, over the entirety of the edge parts on both sides in the width direction.

In this touch panel, the protective layers can be formed such that they are continuous, and therefore the formation of the protective layers is easy.

The protective layers may be formed only at locations where the first electrode and the second electrode intersect one another at the edge parts on both sides in the width direction.

In this touch panel, an effect is achieved wherein the edge parts on both sides in the width direction of the electrically conductive layers of the first electrodes are protected by the protective layers; in addition, it is possible to save on the material of the protective layers.

A resistive film type touch panel may further include second protective layers, which are formed, corresponding to the edge parts on both sides in the width direction of the second electrode, at locations at which the first electrode and the second electrode intersect one another at the first electrode.

In this touch panel, the second protective layers prevent the edge parts on both sides in the width direction of the second electrode from directly contacting the first electrode.

The electrically conductive layer may include an electrically conductive layer main body and a pressure sensitive ink layer, which is formed on a principal surface of the electrically conductive layer main body.

Generally, if the pressure sensitive ink layers are formed on the principal surfaces of the electrically conductive layer main bodies, then it is conceivable that a problem will arise wherein the pressure sensitive ink layers become thin at the edge parts on both sides in the width direction of the electrically conductive layers. This is caused by the fact that, if the electrically conductive layer main bodies are formed by printing, then the edges on both sides in the width direction of the electrically conductive layers will adversely be raised, and consequently the pressure sensitive ink layers will adversely become thin at those portions. In such a case, the electrically conductive layer main bodies will become exposed and the electrically conductive layer main bodies will contact one another; as a result, a high sensitivity element (a pressed point) will adversely arise. Furthermore, an element means one matrix at the intersection point of the first electrode and the second electrode, and a high sensitivity element is an element wherein a resistance value decreases sharply from a normal value as the pressing force increases.

However, in this apparatus, the protective layers protect the edge parts on both sides in the width direction of the electrically conductive layers, and therefore the electrically conductive layer main bodies tend not to become exposed and thereby tend not to contact one another. Accordingly, high sensitivity elements tend not to arise.

The protective layers may be insulative and each may include a protruding part that protrudes from the electrically conductive layer toward the second electrode side.

In this touch panel, the protective layers function as spacers. That is, because of the protruding parts of the protective layers, the electrical conductive layer of the lower side electrode, when it is not being pressed, tends not to contact the electrically conductive layer of the upper side electrode.

A touch panel apparatus according to another aspect of the present invention includes the abovementioned resistive film type touch panel, and therefore the abovementioned effects are obtained.

In the resistive film type touch panel and the touch panel apparatus according to the present invention, damage caused by contact between electrodes is reduced in a touch panel that includes a plurality of first electrodes and a plurality of second electrodes that extend in a direction that intersect one another.

DETAILED DESCRIPTION OF EMBODIMENTS (1) Touch Panel Apparatus

Figure 1:
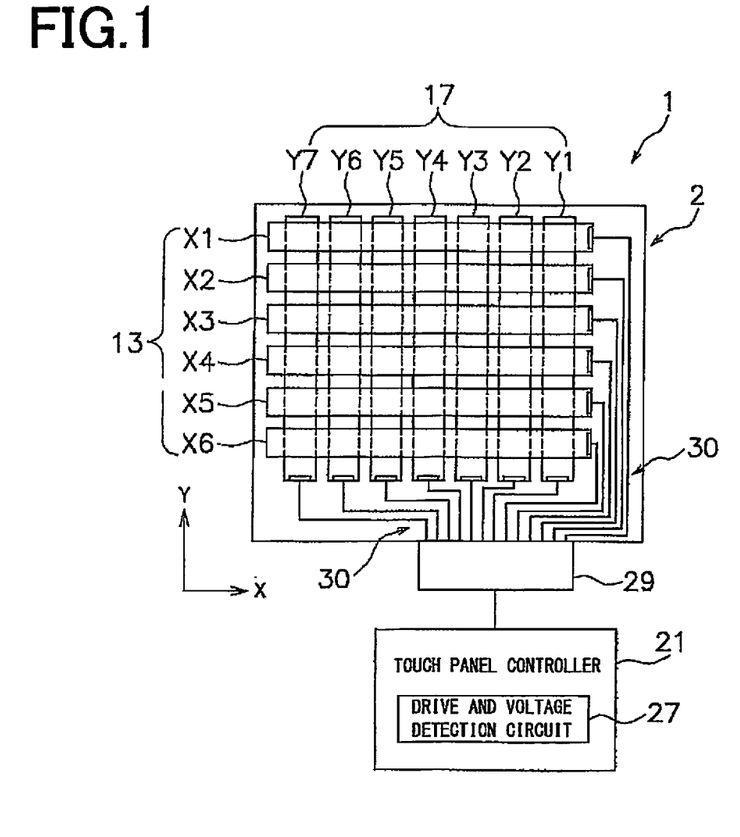
FIG. 1 is a schematic plan view of a touch panel apparatus.
Figure 2:
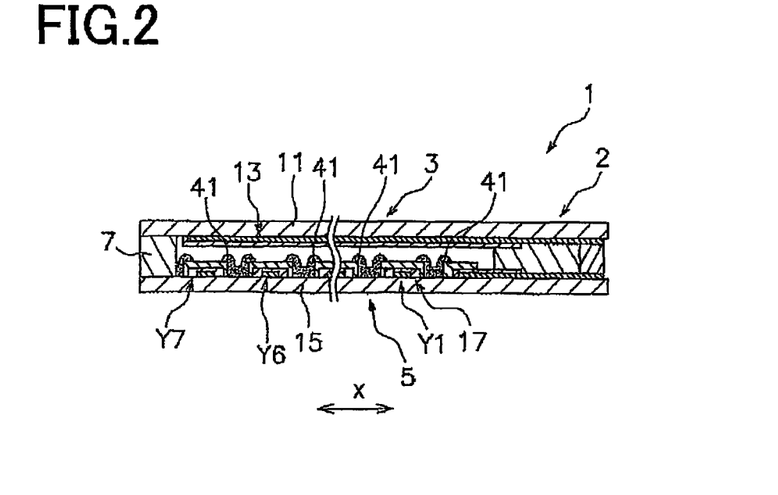
FIG. 2 is a schematic cross sectional view of the touch panel apparatus.

A touch panel apparatus 1 of a first embodiment will now be explained, with reference to FIG. 1 and FIG. 2. FIG. 1 is a schematic plan view of the touch panel apparatus. FIG. 2 is a schematic cross sectional view of the touch panel apparatus. The touch panel apparatus 1 is, for example, a smart phone, a tablet PC, or a notebook PC. The touch panel apparatus 1 includes a matrix type (digital type) resistive film type touch panel 2. The resistive film type touch panel 2 principally includes an upper side electrode member 3 and a lower side electrode member 5. The upper side electrode member 3 includes, for example, a rectangular transparent insulative film 11 and a transparent upper side electrode group 13, which is formed on a lower surface of the transparent insulative film 11. The lower side electrode member 5 includes, for example, a rectangular transparent insulative film 15 and a transparent lower side electrode group 17, which is formed on an upper surface of the transparent insulative film 15. The upper side electrode member 3 and the lower side electrode member 5 are adhered to one another across a spacer 7 at a peripheral edge part.

The touch panel apparatus 1 further includes a touch panel controller 21. The touch panel controller 21 can be implemented by a program and a CPU, RAM, ROM, an IC, and the like incorporated in a computer.

The touch panel controller 21 includes a drive and voltage detection circuit 27. The drive and voltage detection circuit 27 has a function that detects a push down position by impressing a voltage on electrodes and detecting changes therein.

The upper side electrode group 13 and the lower side electrode group 17 are made of a plurality of strip shaped patterns that are respectively formed in the transparent insulative film 11 and the transparent insulative film 15.

The upper side electrode group 13 includes upper side electrodes X1, X2, X3, X4, X5, X6 (one example of second electrodes), with each upper side electrode extending lengthwise in the X direction (one example of second direction), which are the left and right direction in FIG. 1. The lower side electrode group 17 includes lower side electrodes Y1, Y2, Y3, Y4, Y5, Y6, Y7 (one example of first electrodes), with each lower side electrode extending lengthwise in the Y direction (one example of first direction), which are the up and down direction in FIG. 1. Based on the above, with respect to the upper side electrodes, the X direction are the longitudinal direction, and the Y direction are the width direction. In addition, with respect to the lower side electrodes, the Y direction are the longitudinal direction, and the X direction are the width direction.

Based on the above, the resistive film type touch panel 2 is sectionalized into 42 matrix areas, wherein the upper side electrode group 13 including the six electrodes and the lower side electrode group 17 including the seven electrodes overlap. Furthermore, the upper side electrode group 13 and the lower side electrode group 17 are not necessarily orthogonal to one another and may intersect at any angle.

The upper side electrode group 13 and the lower side electrode group 17 oppose one another in the up and down direction. A gap is ensured between the upper side electrode group 13 and the lower side electrode group 17. When an area of the upper side electrodes is pressed down toward the lower side electrodes, the upper side electrodes and the lower side electrodes that are positioned in the push down area become electrically conducting. The pressing down should be performed by, for example, a finger, a stylus pen, a rod, or the like.

Furthermore, as shown in FIG. 1, the resistive film type touch panel 2 is normally connected to the touch panel controller 21 via a connector 29. In addition, lead-out wires 30 are provided that lead from the upper side electrode group 13 and the lower side electrode group 17 to an input/output terminal of the resistive film type touch panel 2. The lead-out wires 30 are usually formed, using a metal, such as gold, silver, copper, or nickel, or an electrically conductive paste made of carbon or the like, by a printing method, such as screen printing, offset printing, gravure printing, or flexography, or by a brush coating method; however, the formation of the lead-out wires 30 is not limited thereto as long as continuity between the connector 29 and the upper side electrode group 13 and between the connector 29 and the lower side electrode group 17 is achieved.

An engineering plastic, such as a polycarbonate based, a polyamide based, or a polyether ketone based engineering plastic, or a resin film, such as an acrylic based, a polyethylene terephthalate based, or a polybutylene terephthalate based resin film, can be used as the transparent insulative film 11.

Furthermore, a hard coating layer can be formed on the upper surface of the transparent insulative film 11. An inorganic material, such as a siloxane based resin, or an organic material, such as an acrylic epoxy based or urethane based thermosetting resin, an acrylate based photosetting resin, or the like can be used as the hard coating layer.

In addition, the upper surface of the transparent insulative film 11 can be given a non-glare treatment in order to prevent the reflection of light. For example, the surface should be roughened, an extender or fine particles such as silica or alumina should be mixed in the hard coating layer, or the like. Furthermore, the transparent insulative film 11 can also be formed as a laminated body, wherein, instead of one film, a plurality of films are overlapped.

As in the transparent insulative film 11 of the upper side electrode member 3, it is possible to use, as the transparent insulative film 15 used in the lower side electrode member 5, an engineering plastic, such as a polycarbonate based, a polyamide based, or a polyether ketone based engineering plastic, or a film, such as an acrylic based, a polyethylene terephthalate based, or a polybutylene terephthalate based film; in addition, the transparent insulative film 15 can also be formed as a laminated body, wherein, instead of one film, a plurality of films is overlapped.

As discussed above, the spacer 7 is present between the upper side electrode member 3 and the lower side electrode member 5. The spacer 7 is generally formed into a frame shape or the like. In addition to the resin films as in the transparent insulative base material, a print layer or a coating layer made of a suitable resin, such as an acrylic resin, an epoxy based resin, or a silicone based resin, can be used as the spacer 7. The spacer 7 is generally formed by combining the frame shape, which fixes the upper side electrode member 3 and the lower side electrode member 5, with adhesive layers made of two-sided tape, an adhesive agent, or a gluing agent. If forming the adhesive layer with an adhesive agent or a gluing agent, then screen printing or the like is used.

(2) Upper Side Electrode Group and Lower Side Electrode Group

Figure 3A:
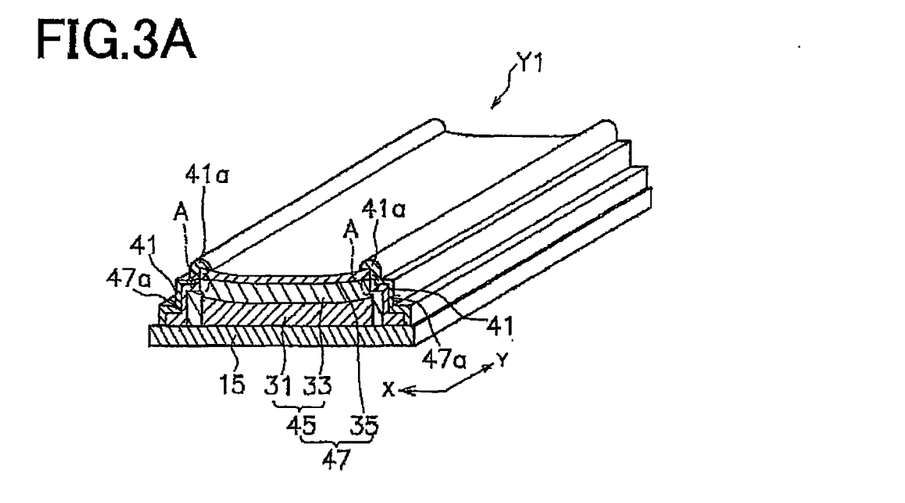
FIG. 3A is a schematic cross sectional view of a lower side electrode.
Figure 3B:
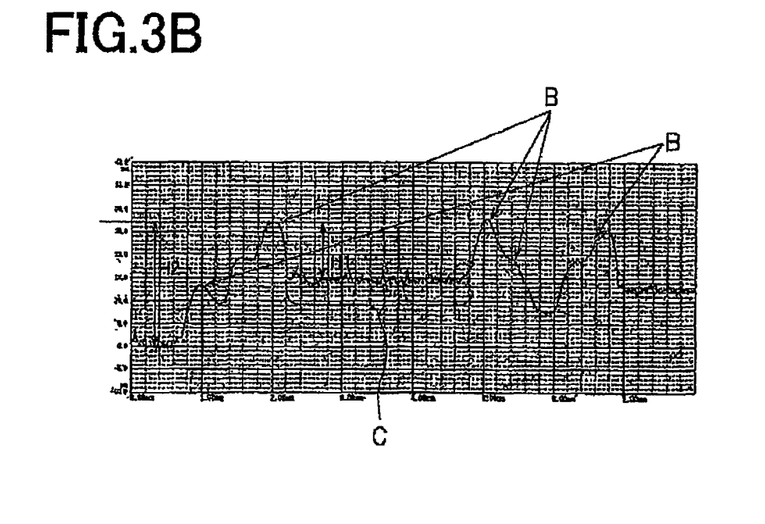
FIG. 3B is a graph that shows the measurement of the cross sectional height of the lower side electrode.

The details of the structure of the lower side electrodes will now be explained, with reference to FIG. 3A and FIG. 3B. FIG. 3A is a schematic cross sectional view of the lower side electrode. FIG. 3B is a graph that shows the measurement of the cross sectional height of the lower side electrode. Furthermore, FIG. 3B (likewise FIG. 6B, FIG. 7B, and FIG. 8B) shows the measurement results obtained by a step gauge.

As shown in FIG. 3A, the lower side electrode Y1 includes a silver layer 31, a carbon layer 33, and a pressure sensitive ink layer 35, which are on the transparent insulative film 15. The carbon layer 33 protects the silver layer from deterioration, such as by sulfiding, and furthermore smoothes the surface. As discussed above, in the present embodiment, an electrically conductive layer main body 45 is formed by the silver layer 31 and the carbon layer 33, and an electrically conductive layer 47 is formed by the addition of the pressure sensitive ink layer 35 thereto. Furthermore, the electrically conductive layer main body may be a single body made of either a silver layer or a carbon layer.

The thickness of the transparent insulative film 15 is, for example, 125 μm, and is preferably in the range of 25-200 μm. The thickness of the silver layer 31 is, for example, 4 μm, and is preferably in the range of 3-10 μm. The thickness of the carbon layer 33 is, for example, 5 μm, and is preferably in the range of 3-30 μm. The thickness of the pressure sensitive ink layer 35 is, for example, 10 μm, and is preferably in the range of 5-20 μm.

The composition that constitutes the pressure sensitive ink layer 35 is a raw material whose electrical characteristics, such as the electrical resistance value, changes in accordance with an external force. For example, a quantum tunneling composite (product name: "QTC™") made by Peratech of the United Kingdom can be used as the composition. The pressure sensitive ink layer 35 can be disposed by application. A printing method, such as screen printing, offset printing, gravure printing, or flexography, can be used as the method of applying the pressure sensitive ink layer 35.

Protective layers 41 are formed on the lower side electrode Y1. The protective layers 41 are formed on edge parts 47a on both sides in the width direction of the electrically conductive layer 47 such that they extend in the Y direction. The protective layers 41 are formed, in the Y direction, over the entirety of the edge parts 47a on both sides in the width direction. As shown in FIG. 2, each protective layer 41 is formed such that it spans two of the lower side electrodes and is formed up to above the edge parts 47a on both sides in the width direction of the lower side electrodes. More specifically, each protective layer 41 includes protruding parts 41a, each of which extends from an upper surface of an edge part of the corresponding pressure sensitive ink layer 35 to an end part of a principal surface part (a flat upper surface part) of that pressure sensitive ink layer 35. Each protruding part 41a extends further upward from the principal surface part of its corresponding pressure sensitive ink layer 35. However, a gap is ensured between the protruding part 41a and the upper side electrodes.

The protective layers 41 function as bar shaped spacers. Namely, they function to ensure an air gap between the lower side electrodes and the upper side electrodes, to control the input load, to increase the separation between the lower side electrodes and the upper side electrodes after input, and the like.

In addition to a resin film as in the transparent insulative film, a print layer or a coating layer made of a suitable resin, such as an acrylic resin, an epoxy based resin, or a silicone based resin, can be used for the protective layers 41. The protective layers 41 are formed by screen printing or some other printing method.

The silver layers 31, the carbon layers 33, the pressure sensitive ink layers 35, and the protective layers 41 are applied sequentially by, for example, a screen printing method. Accordingly, the edges in the width direction of each layer are raised. Consequently, as shown in FIG. 3B, a plurality of projecting parts B is formed by the protective layers 41 on the edge parts 47a on both sides in the width direction of the lower side electrode Y1. Furthermore, a surface C is formed by the pressure sensitive ink layer 35 at an intermediate part in the width direction of the lower side electrode Y1.

As shown in FIG. 3B, a distance H1 between the protruding parts 41a of the protective layers 41 and the end parts of the pressure sensitive ink layer 35 is, for example, 10 μm. In addition, as shown in FIG. 3B, a distance H2 between the protruding parts 41a of the protective layers 41 and the transparent insulative film 15 is, for example, 30 μm.

Furthermore, the upper side electrodes are the same as the lower side electrodes, and therefore an explanation thereof is omitted. However, in the upper side electrodes, the pressure sensitive ink layers and the protective layers can be omitted.

(3) Positional Relationship Between Electrodes

Figure 4:
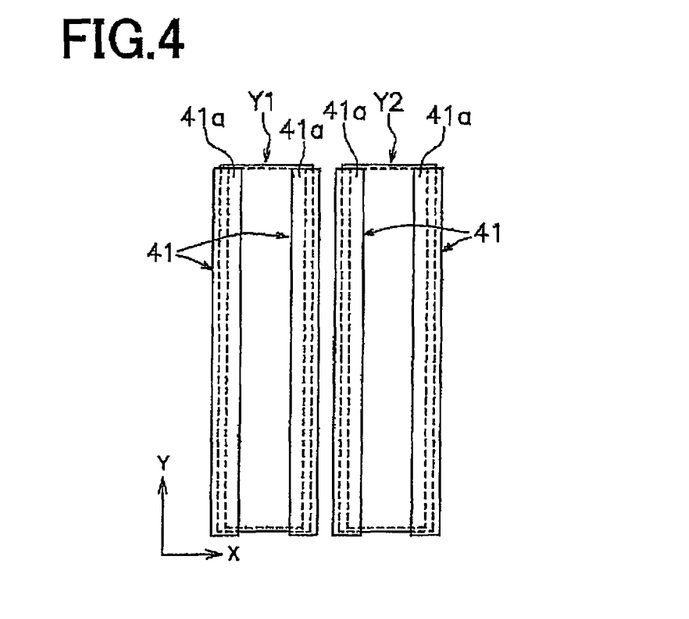
FIG. 4 is a partial plan view of the lower side electrodes.
Figure 5:
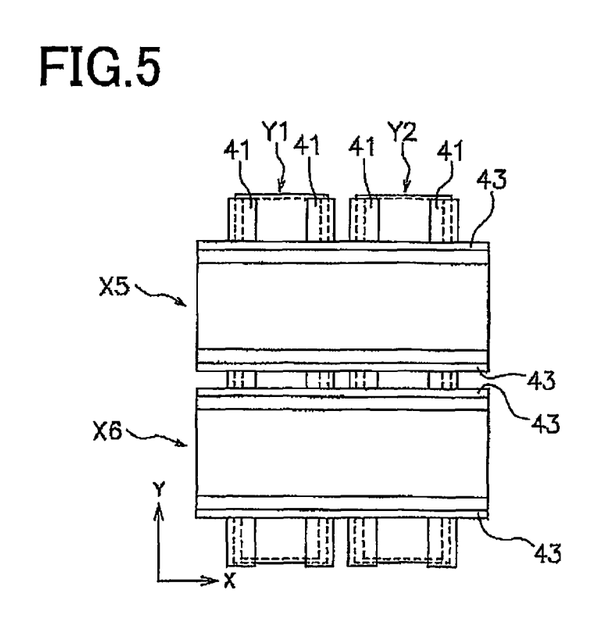
FIG. 5 is a partial plan view of a state wherein upper side electrodes overlap the lower side electrodes.

The positional relationship between the lower side electrodes and the upper side electrodes will now be explained, with reference to FIG. 4 and FIG. 5. FIG. 4 is a partial plan view of the lower side electrodes. FIG. 5 is a partial plan view that shows a state wherein the upper side electrodes overlap the lower side electrodes.

As shown in FIG. 4, the protective layers 41 extend in the Y direction along the lower side electrodes Y1, Y2. In the present embodiment, adjacent protective layers provided to different lower side electrodes are isolated, but may be formed such that they are continuous. As shown in FIG. 5, protective layers 43 are likewise formed on the upper side electrodes X5, X6 as well.

In the present embodiment, the protective layers are formed on the upper side electrodes as well, but the protective layers on the upper side electrodes may be omitted.

(4) Electrode Manufacturing Method

Figure 6A:
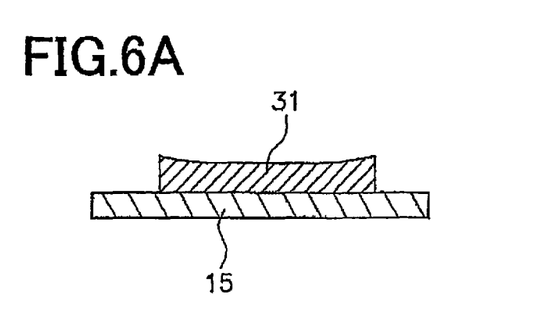
FIG. 6A is a schematic cross sectional view that shows the state after a layer has been formed.

A method of manufacturing the lower side electrodes will now be explained, with reference to FIG. 6A, FIG. 6B, FIG. 7A, FIG. 7B, FIG. 8A, and FIG. 8B. FIG. 6A, FIG. 7A, and FIG. 8A are schematic cross sectional views of the states after the layers have been formed, and FIG. 6B, FIG. 7B, and FIG. 8B are graphs that show measurements of the cross sectional heights of the layers.

Figure 6B:
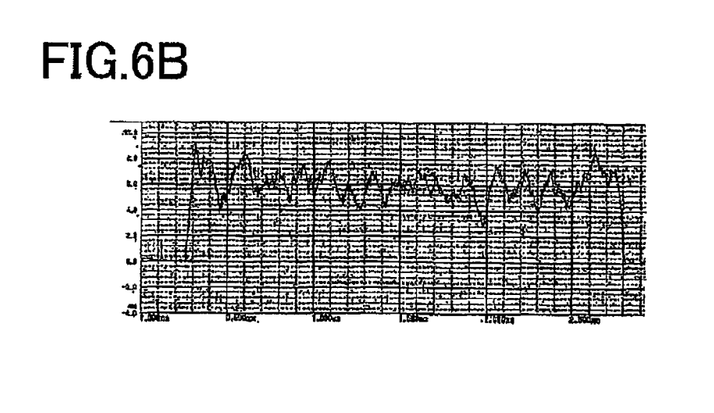
FIG. 6B is a graph that shows the measurement of the cross sectional height of the layers.
Figure 7A:
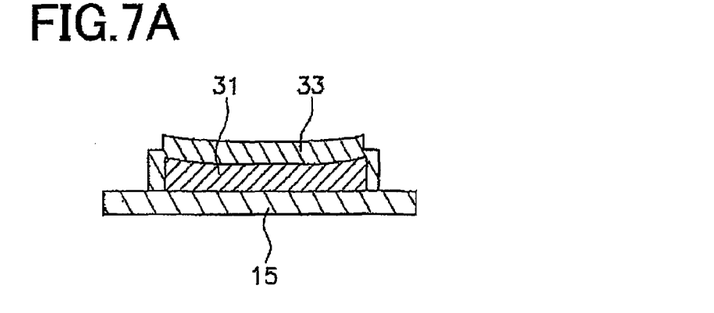
FIG. 7A is a schematic cross sectional view that shows the state after the layers have been formed.

First, as shown in FIG. 6A and FIG. 6B, the silver layer 31 is formed on the transparent insulative film 15 by screen printing.

Figure 7B:
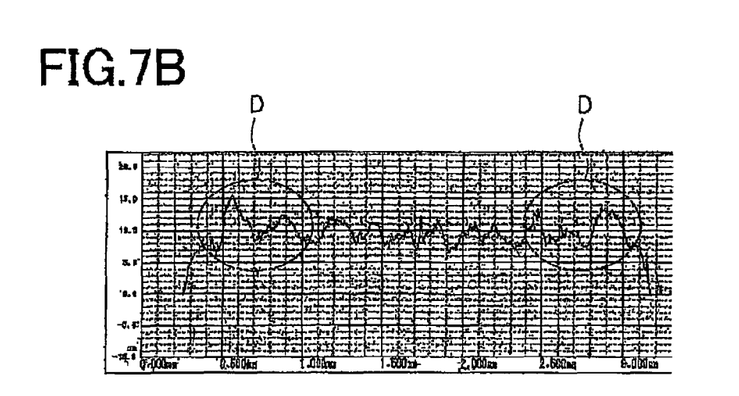
FIG. 7B is a graph that shows the measurement of the cross sectional height of the layers.
Figure 8A:
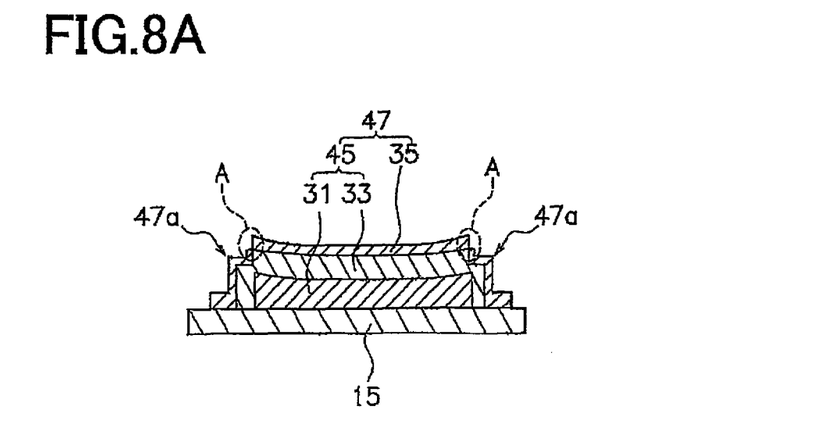
FIG. 8A is a schematic cross sectional view that shows the state after the layers have been formed.

Next, as shown in FIG. 7A and FIG. 7B, the carbon layer 33 is formed on the silver layer 31 by screen printing. At this time, as shown in FIG. 7B, raised portions D arise at the edge parts on both sides in the width direction of the carbon layer 33.

Figure 8B:
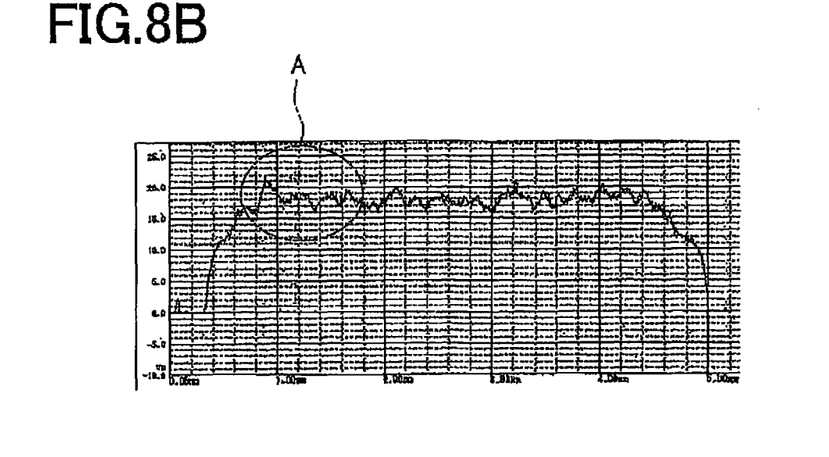
FIG. 8B is a graph that shows the measurement of the cross sectional height of the layers.

Next, as shown in FIG. 8A and FIG. 8B, the pressure sensitive ink layer 35 is formed on the carbon layer 33 by screen printing. At this time, as shown in FIG. 8B, raised portions A occur at the edge parts on both sides in the width direction of the pressure sensitive ink layer 35. Furthermore, the pressure sensitive ink layer 35 is thinner at the raised portions A than at other portions.

Lastly, as shown in FIG. 3A and FIG. 3B, the protective layers 41 are formed, by screen printing, on the edge parts 47a on both sides in the width direction of the electrically conductive layer 47. As a result, the raised portions A of the electrically conductive layer 47 are covered by the protective layers 41. Specifically, the protruding parts 41a of the protective layers 41 cover the edge parts 47a on both sides in the width direction of the electrically conductive layer 47, namely, the raised portions A.

(5) Effects of Protective Layers

The protective layers 41 obtain the effects below.

1) The protective layers 41 function as bar shaped spacers. In this case, as spacers, the protective layers 41 can obtain a height that is sufficient and stable. In contrast, in the case of conventional dot shaped spacers, it is difficult to control the arrangement positions and the shapes of the spacers, and therefore there are cases in which a sufficient height is not obtained.

2) The protective layers 41 are formed only at the edges of the electrically conductive layers 47, and therefore variance in the sensitivity tends not to occur at the center portions of the principal surface parts of the electrically conductive layers 47 (i.e., the portions at which the pressure sensitive ink layers 35 are exposed).

3) In the abovementioned embodiment, the pressure sensitive ink layers 35 are formed on the upper surfaces of the electrically conductive layer main bodies 45; in such a case, it is conceivable that a problem will arise wherein the pressure sensitive ink layers 35 become thin at the edge parts 47a on both sides in the width direction of the electrically conductive layers 47. This is caused by the fact that, if the electrically conductive layer main bodies 45 are formed by printing, then the edge parts 47a on both sides in the width direction of the electrically conductive layers 47 will adversely be raised, and consequently the pressure sensitive ink layers 35 will adversely become thin at those portions. Furthermore, in such a case, the carbon layers 33 will become exposed and contact the upper side electrodes and, as a result, a high sensitivity element (a pressed point) will adversely arise. Furthermore, an element means one matrix at the intersection point of an upper part electrode and a lower part electrode, and a high sensitivity element means an element wherein a resistance value decreases sharply from a normal value as the pressing force increases.

However, in the touch panel apparatus 1, the protective layers 41 protect the edge parts 47a on both sides in the width direction of the electrically conductive layers 47, and therefore the carbon layers 33 tend not to become exposed. Accordingly, high sensitivity elements tend not to arise.

(6) Other Embodiments

The text above explained one embodiment of the present invention, but the present invention is not limited to the abovementioned embodiment, and it is understood that variations and modifications may be effected without departing from the essence of the invention. In particular, the embodiments and modified examples written in the present specification can be arbitrarily combined as needed.

(6-1) Second Embodiment

Figure 9:
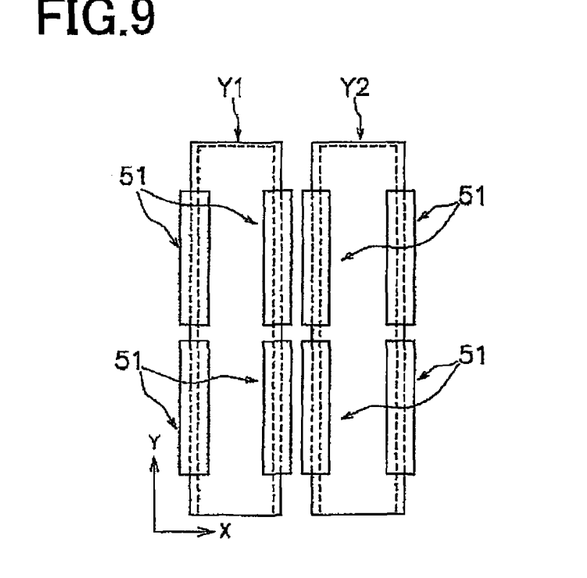
FIG. 9 is a partial plan view of the lower side electrodes (second embodiment).
Figure 10:
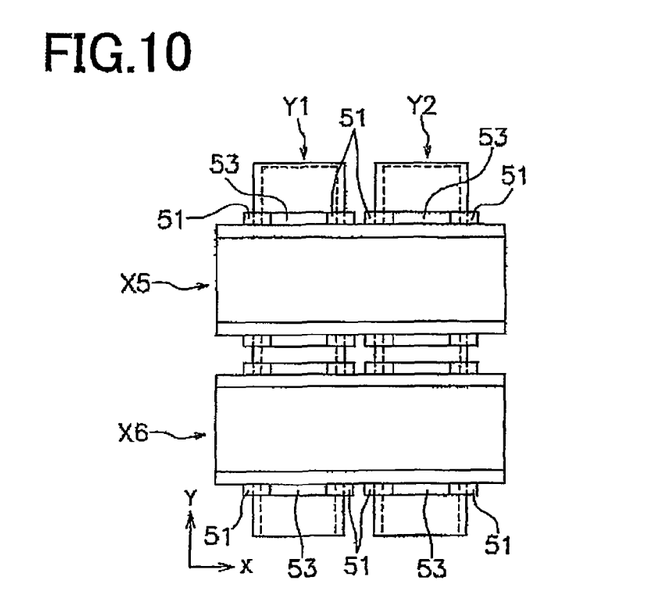
FIG. 10 is a partial plan view that shows the state wherein the upper side electrodes overlap the lower side electrodes (second embodiment)

A second embodiment will now be explained, referencing FIG. 9 and FIG. 10. FIG. 9 is a partial plan view of the lower side electrodes. FIG. 10 is a partial plan view of a state wherein the upper side electrodes overlap the lower side electrodes.

As shown in FIG. 9, protective layers 51 extend in the Y direction along the lower side electrodes Y1, Y2. The protective layers 51 are formed only at locations where the lower side electrodes and the upper side electrodes intersect one another at the edge parts on both sides in the width direction of the lower side electrodes. In this apparatus, an effect is achieved wherein the edge parts on both sides in the width direction of the electrically conductive layers of the lower side electrodes are protected by the protective layers; in addition, it is possible to save on the material of the protective layers.

In addition, as shown in FIG. 10, protective layers 53 are likewise formed on the upper side electrodes X5, X6 as well. The protective layers 53 are formed only at locations where the lower side electrodes and the upper side electrodes intersect one another at the edge parts on both sides in the width direction of the upper side electrodes. In this apparatus, an effect is achieved wherein the edge parts on both sides in the width direction of the electrically conductive layers of the upper side electrodes are protected by the protective layers; furthermore, it is possible to save on the material of the protective layers.

In the present embodiment, the protective layers are formed on the upper side electrodes as well, but the protective layers of the upper side electrodes may be omitted.

(6-2) Third Embodiment

Figure 11:
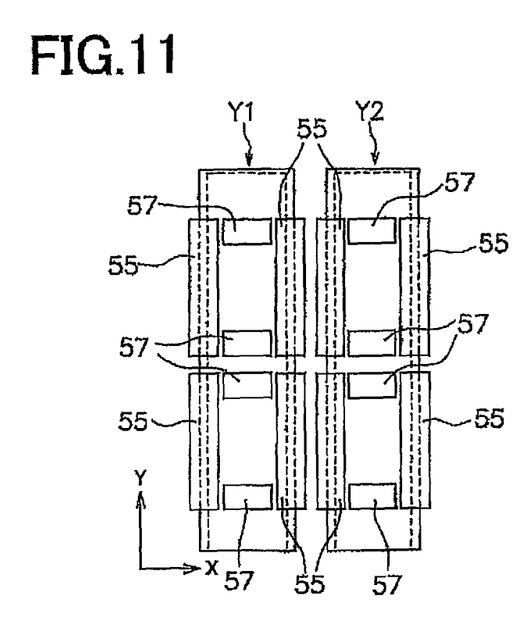
FIG. 11 is a partial plan view of the lower side electrodes (third embodiment)
Figure 12:
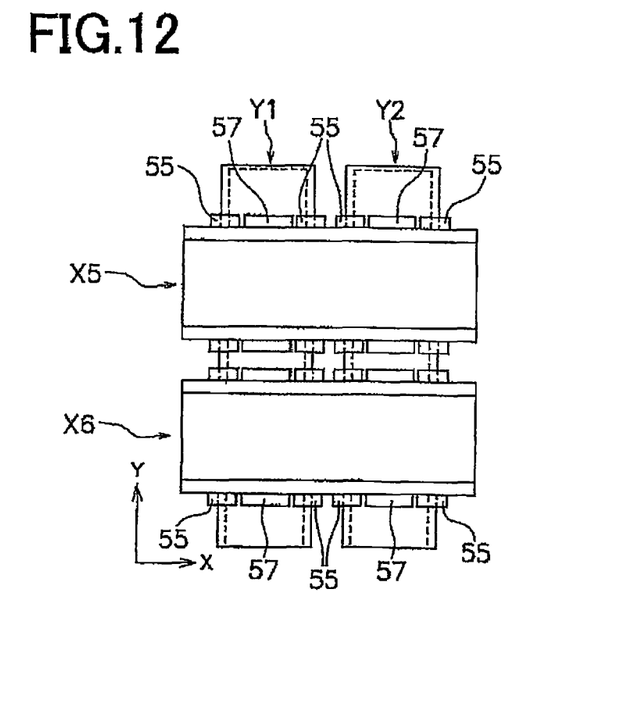
FIG. 12 is a partial plan view that shows a state wherein the upper side electrodes overlap the lower side electrodes (third embodiment)

A third embodiment will now be explained, referencing FIG. 11 and FIG. 12. FIG. 11 is a partial plan view of the lower side electrodes. FIG. 12 is a partial plan view that shows a state wherein the upper side electrodes overlap the lower side electrodes.

As shown in FIG. 11, first protective layers 55 extend in the Y direction along the lower side electrodes Y1, Y2. The first protective layers 55 are formed only at locations where the lower side electrodes and the upper side electrodes intersect one another at the edge parts on both sides in the width direction of the lower side electrodes. In this apparatus, an effect is achieved wherein the edge parts on both sides in the width direction of the electrically conductive layers of the lower side electrodes are protected by the protective layers; furthermore, it is possible to save on the material of the protective layers.

In addition, as shown in FIG. 11, second protective layers 57 are formed on the principal surfaces of the electrically conductive layers of the lower side electrodes. The second protective layers 57 are formed, corresponding to the edge parts on both sides in the width direction of the upper side electrodes, at the locations where the lower side electrodes and the upper side electrodes intersect one another at the lower side electrodes.

In the present embodiment, the protective layers are not formed on the upper side electrodes.

(6-3) Fourth Embodiment

In the abovementioned embodiments, the electrically conductive layers include the silver layers, the carbon layers, and the pressure sensitive ink layers, but the present invention is not particularly limited to such embodiments; for example, the electrically conductive layers may be configured without the pressure sensitive ink layers.

Figure 13:
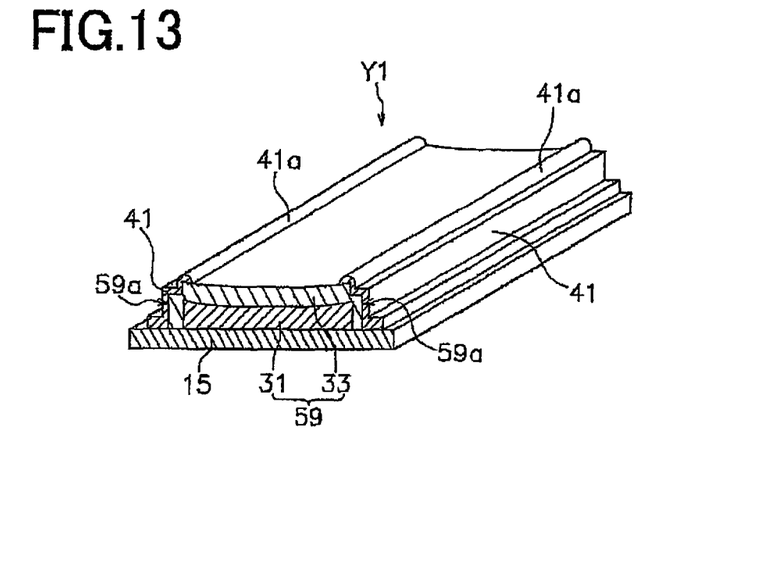
FIG. 13 is a schematic cross sectional view of the lower side electrodes (fourth embodiment)

A fourth embodiment will now be explained, with reference to FIG. 13. FIG. 13 is a schematic cross sectional view of the lower side electrode.

As shown in FIG. 13, the lower side electrode Y1 includes the silver layer 31 and the carbon layer 33, which are formed on the transparent insulative film 15. An electrically conductive layer 59 is formed by the silver layer 31 and the carbon layer 33.

The protective layers 41 are formed on the lower side electrode Y1. The protective layers 41 are formed, on edge parts 59a on both sides in the width direction of the electrically conductive layer 59, such that they extend in the Y direction. The protective layers 41 are formed, in the Y direction, over the entirety of the edge parts 59a on both sides in the width direction. More specifically, each protective layer 41 includes the protruding parts 41a, each of which is formed such that it extends from the upper surface of the edge part of the corresponding carbon layer 33 to a position above the end part of the principal surface part of that carbon layer 33. Each protruding part 41a extends further upward from the principal surface part of its corresponding carbon layer 33.

Each protective layer 41 functions as a bar shaped spacer. Namely, it functions to ensure the air gap between the lower side electrodes and the upper side electrodes, to control the input load, to cause the lower side electrodes and the upper side electrodes to quickly separate from each other after input, and the like.

In the present embodiment as well, the protective layers 41 obtain effects the same as those in the abovementioned embodiments.

(6-4) Fifth Embodiment

In the abovementioned embodiments, the electrically conductive layers include the silver layers, the carbon layers, and the pressure sensitive ink layers, but the present invention is not particularly limited to such embodiments; for example, materials other than the silver layers or the carbon layers may be used. In either case, the edge parts on both sides in the width direction of the electrically conductive layers are protected by the protective layers.

Figure 14:
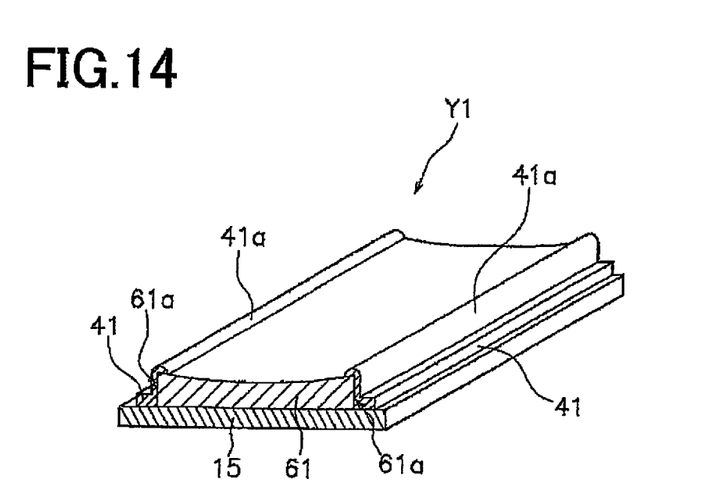
FIG. 14 is a schematic cross sectional view of the lower side electrodes (fifth embodiment).

A fifth embodiment will now be explained, with reference to FIG. 14. FIG. 14 is a schematic cross sectional view of the lower side electrode.

As shown in FIG. 14, the lower side electrode Y1 includes an ITO layer 61, which is formed on the transparent insulative film 15.

The protective layers 41 are formed on the lower side electrode Y1. The protective layers 41 are formed on edge parts 61a on both sides in the width direction of the ITO layer 61 such that they extend in the Y direction. The protective layers 41 are formed, in the Y direction, over the entirety of the edge parts 61a on both sides in the width direction. More specifically, the protective layers 41 include the protruding parts 41a, which are formed on the end parts of the principal surface part of the ITO layer 61. Each protruding part 41a extends further upward from the principal surface part of the ITO layer 61.

(6-5) Modified Example of Material of Electrically Conductive Layer

The material of the electrodes can be formed from: a metal oxide film made of tin oxide, indium oxide, antimony oxide, zinc oxide, cadmium oxide, indium tin oxide (ITO), or the like; a composite film that principally includes these metal oxides; or a metal film made of gold, silver, copper, tin, nickel, aluminum, palladium, or the like. In addition, the upper side electrode group and the lower side electrode group each can be formed as a multilayer film of two or more layers. These transparent electrically conductive films that constitute the transparent electrodes can be formed by vacuum deposition, sputtering, ion plating, CVD, or the like. The transparent electrically conductive films can be patterned by a method wherein an etching process is performed using an acid, and unneeded portions, i.e., outside of the portions that form the transparent electrodes, are eliminated. In addition, portions outside of the portions on the transparent electrically conductive films that form the transparent electrodes may be covered with an insulative coating.

In one example of the electrodes, each of the electrodes may be a Cu electrode having a thickness of 2-50 μm.

(6-6) Modified Example of the Pressure Sensitive Ink Layer

In the abovementioned embodiments, the pressure sensitive ink layers are provided only on the lower side electrodes or on the lower side electrodes and the upper side electrodes, but the pressure sensitive ink layers may be formed only on the upper side electrodes.

One or more metals, other conducting or semiconducting elements or oxides, or conducting or semiconducting organic or inorganic polymers can be used as the material of the pressure sensitive ink layers. In greater detail, it is possible to use titanium, tantalum, zirconium, vanadium, niobium, hafnium, aluminum, silicon, tin, chrome, molybdenum, tungsten, lead, manganese, beryllium, iron, cobalt, nickel, platinum, palladium, osmium, iridium, rhenium, technetium, rhodium, ruthenium, gold, silver, cadmium, copper, zinc, germanium, arsenic, antimony, bismuth, boron, scandium, one or more metal in the lanthanide or actinide series, or, if suitable, at least one or more electrically conductive agents. The conductive filler can be a basic element in a nonoxidized state. In addition, the electrically conductive material may be in the form of a powder, particles, or fibers. The shape is preferably spherical with a diameter of 0.04-0.2 μm. Furthermore, the variance should be controlled in accordance with the pressure sensitivity.

Carbon ink may be used as the pressure sensitive ink.

It may be a semiconductive pressure sensitive ink (e.g., a pressure sensitive rubber wherein an electrically conductive filler is used on a silicone rubber, or a high elasticity resin to which a semiconductive filler, such as molybdenum sulfide, has been added and that does not elastically deform).

(7) Concepts Shared Among the Embodiments

Concepts shared among the abovementioned embodiments are explained below.

The resistive film type touch panel (e.g., the resistive film type touch panel 2) includes the plurality of first electrodes (e.g., the lower side electrodes Y1, Y2) and the plurality of second electrodes (e.g., the upper side electrodes X1, X2). The first electrodes extend in the first direction (e.g., the Y direction). The second electrodes extend in the second direction (e.g., the X direction), which intersect the first direction, and oppose the plurality of first electrodes. Each first electrode includes the electrically conductive layer (e.g., the electrically conductive layer 47, the electrically conductive layer 59, or the ITO layer 61) and the protective layers (e.g., the protective layers 41, the protective layers 51, the first protective layers 55, or the second protective layers 57), and the electrically conductive layer extends in the first direction. The protective layers are formed on the edge parts on both sides in the width direction of the electrically conductive layer (e.g., the edge parts 47a on both sides in the width direction, the edge parts 59a on both sides in the width direction, or the edge parts 61a on both sides in the width direction) such that they extend in the first direction. In this apparatus, when a user presses an intersection point of one of the first electrodes and one of the second electrodes, the coordinates of that intersection point are detected. In this case, the edge parts on both sides in the width direction of the electrically conductive layer of the first electrode is protected by the protective layers and therefore tends not to get damaged.

The present invention can be widely adapted to resistive film type touch panels and touch panel apparatuses.

The invention claimed is:

1. A resistive film type touch panel, comprising:
a plurality of first electrodes extending in a first direction; and
a plurality of second electrodes extending in a second direction intersecting the first direction, the plurality of second electrodes opposing the plurality of first electrodes;
each first electrode including:
an electrically conductive layer extending in the first direction; and
protective layers extending in the first direction and formed on edge parts on both sides in a width direction of the electrically conductive layer, the protective layers being insulative and each including a protruding part formed on both ends of a principal surface in a width direction of the electrically conductive layer and protruding from the electrically conductive layer toward the second electrodes.

2. The resistive film type touch panel according to claim 1, wherein
the protective layers are formed, in the first direction, over the entirety of the edge parts on both sides in the width direction.

3. The A resistive film type touch panel according to claim 1, wherein
the protective layers are formed only at locations where the first electrode and the second electrode intersect one another at the edge parts on both sides in the width direction.

4. The resistive film type touch panel according to claim 3, further comprising:
second protective layers formed, corresponding to the edge parts on both sides in the width direction of the second electrode, at locations at which the first electrode and the second electrode intersect one another at the first electrode.

5. The resistive film type touch panel according to claim 1, wherein
the electrically conductive layer includes an electrically conductive layer main body and a pressure sensitive ink layer formed on a principal surface of the electrically conductive layer main body.

6. The resistive film type touch panel according to claim 2, wherein
the electrically conductive layer includes an electrically conductive layer main body and a pressure sensitive ink layer formed on a principal surface of the electrically conductive layer main body.

7. The resistive film type touch panel according to claim 3, wherein
the electrically conductive layer includes an electrically conductive layer main body and a pressure sensitive ink layer formed on a principal surface of the electrically conductive layer main body.

8. The resistive film type touch panel according to claim 4, wherein
the electrically conductive layer includes an electrically conductive layer main body and a pressure sensitive ink layer formed on a principal surface of the electrically conductive layer main body.

9. A touch panel apparatus, comprising:
a resistive film type touch panel according to claim 1.

10. The touch panel apparatus according to claim 9, wherein
the protective layers are formed, in the first direction, over the entirety of the edge parts on both sides in the width direction.

11. The touch panel apparatus according to claim 9, wherein
the protective layers are formed only at locations where the first electrode and the second electrode intersect one another at the edge parts on both sides in the width direction.

12. The touch panel apparatus according to claim 11, wherein the resistive film type touch panel further includes second protective layers formed, corresponding to the edge parts on both sides in the width direction of the second electrode, at locations at which the first electrode and the second electrode intersect one another at the first electrode.

13. A method of manufacturing a resistive film type touch panel, comprising:
- forming a plurality of first electrodes extending in a first direction; and
- forming a plurality of second electrodes extending in a second direction intersecting the first direction, the plurality of second electrodes opposing the plurality of first electrodes;
- the step of forming the plurality of first electrodes including:
  - forming an electrically conductive layer on a substrate by printing; and
  - forming protective layers by printing, the protective layers extending in the first direction and formed on edge parts on both sides in a width direction of the electrically conductive layer, the protective layers being insulative and each including a protruding part formed on both ends of a principal surface in a width direction of the electrically conductive layer and protruding from the electrically conductive layer toward the second electrode side.

14. The method according to claim 13, wherein the step of forming the conductive layer includes:
- forming an electrically conductive layer main body extending in the first direction on the substrate by printing; and
- forming a pressure sensitive ink layer formed on a principal surface of the electrically conductive layer main body by printing.

* * * * *